Oct. 21, 1958  R. S. AMES  2,856,634
METHODS AND APPARATUS FOR MAKING MULTI-AXIALLY
STRETCHED AIRCRAFT CANOPIES AND THE LIKE
Filed June 13, 1955  2 Sheets-Sheet 1

INVENTOR.
Robert S. Ames
BY

Oct. 21, 1958  R. S. AMES  2,856,634
METHODS AND APPARATUS FOR MAKING MULTI-AXIALLY
STRETCHED AIRCRAFT CANOPIES AND THE LIKE
Filed June 13, 1955  2 Sheets-Sheet 2
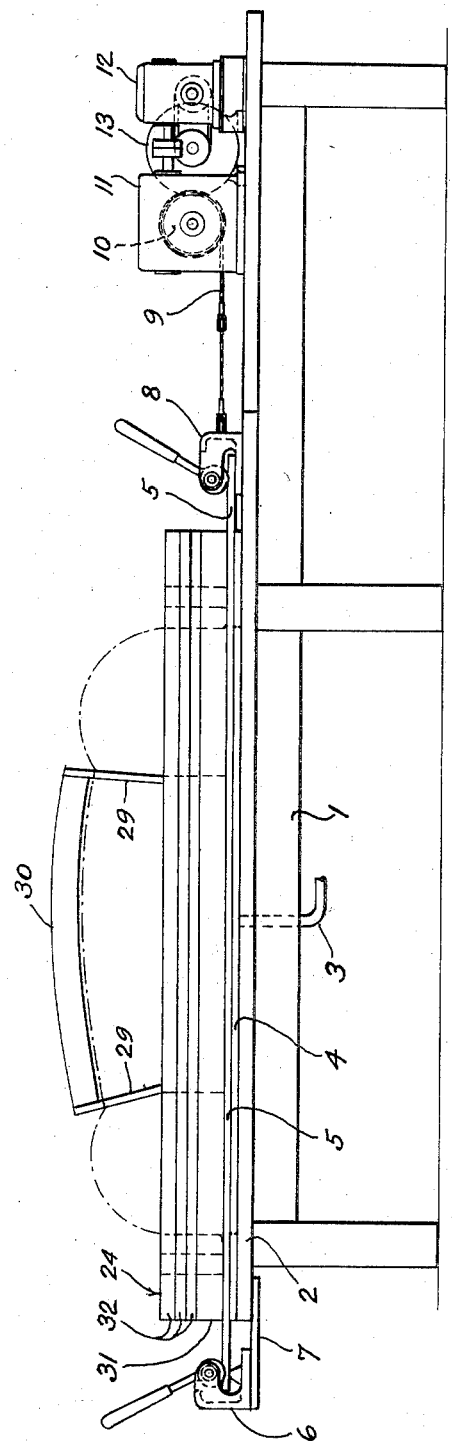
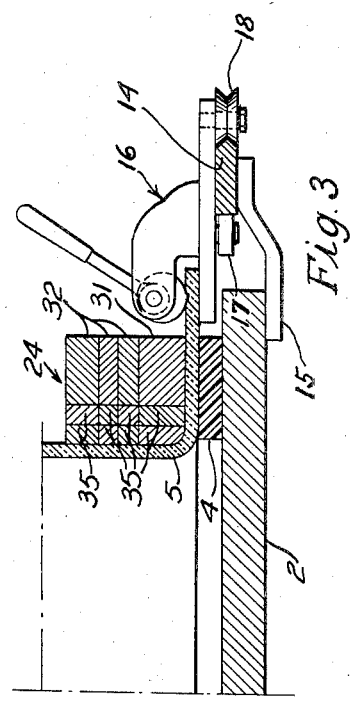
INVENTOR.
Robert S. Ames
BY

United States Patent Office 2,856,634
Patented Oct. 21, 1958

2,856,634

METHODS AND APPARATUS FOR MAKING MULTI-AXIALLY STRETCHED AIRCRAFT CANOPIES AND THE LIKE

Robert S. Ames, Cuyahoga Falls, Ohio, assignor to Goodyear Aircraft Corporation, Akron, Ohio, a corporation of Delaware Application June 13, 1955, Serial No. 514,830

6 Claims. (Cl. 18—19)

This invention relates to methods and apparatus for making compoundly curved aircraft enclosures from transparent plastic sheet material, such as methyl methacrylate, and more particularly, is concerned with methods and apparatus for effecting a bi-axial stretching of the sheet material before or during the formation of the canopy, the bi-axial stretching being in the neighborhood of 100%.

It is the general object of the invention to improve the physical characteristics of transparent plastic canopies for aircraft and the like, and specifically to improve the shatter resistance of such canopies by the provision of methods and apparatus for stretching the sheet material longitudinally and laterally up to 100% prior to or during the formation of the canopy.

Another object of the invention is to provide methods and apparatus of relatively simple, inexpensive and readily performed type for effecting the stretching of the sheet material and its shaping into a canopy.

Another object of the invention is the provision of a method and an apparatus whereby the transparent sheet material to be formed into a canopy is first stretched longitudinally to about twice its length and while held in stretched condition is then formed into a compoundly curved canopy shape, the lateral stretching of the material during the forming to the canopy being greater than normal and approaching 100%.

Another object of the invention is to control the amount of lateral stretching of the sheet material during its formation to canopy shape by controlling the depth, i. e. thickness of the jig in which the canopy is formed.

Another object of the invention is to control the front to rear curve of the top of the canopy by controlling the size of circular pods formed integrally with the canopy at the front and rear thereof.

Another object of the invention is to hold the sides of the transparent plastic sheet against inward movement during the longitudinal stretching of the sheet, but without interfering with the longitudinal stretching of the sheet.

For a better understanding of the invention reference should be had to the accompanying drawings wherein Fig. 1 is a plan view of a typical apparatus incorporating the features of the invention;

Fig. 2 is a side elevation of the apparatus of Fig. 1 but with the sliding side clamps removed to better illustrate the other features of the apparatus;

Fig. 3 is an enlarged fragmentary sectional view taken on line III—III of Fig. 1 and illustrating details of the pod opening shims and a sliding side clamp;

Figure 1:
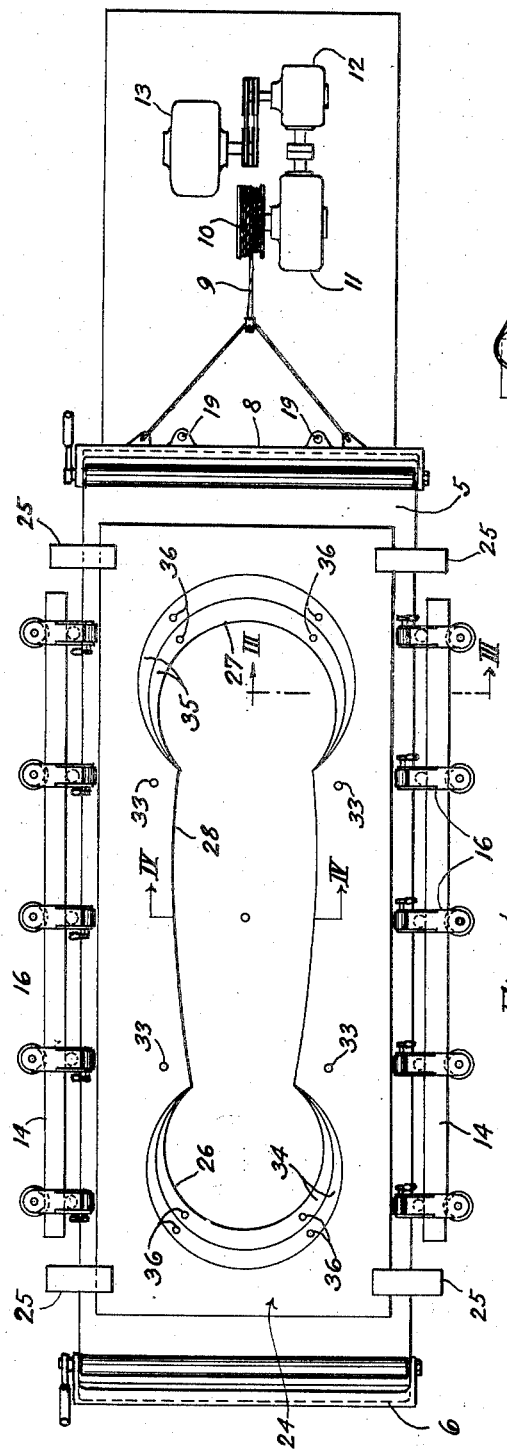
Figure 5:
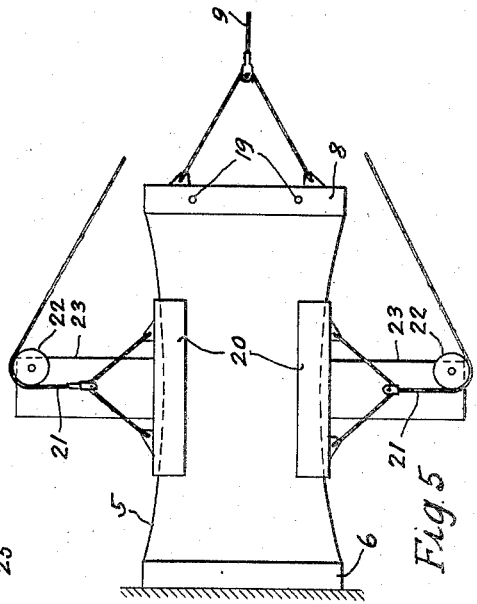
Figure 4:
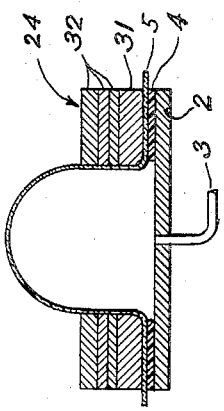

Fig. 4 is an enlarged fragmentary sectional view taken substantially on line IV—IV of Fig. 1 and showing the manner of effecting extra lateral stretching of the sheet material during the forming of the canopy; and Fig. 5 is a diagrammatic plan view of a modification of the apparatus for effecting both longitudinal and lateral stretching of the plastic sheet material prior to formation into a canopy.

Having particular reference to Figs. 1 to 4 of the drawings, the numeral 1 indicates a frame or table carrying as its top a flat metal plate 2 of rectangular shape and with the plate 2 having a conduct 3 connected thereto and extending theretnrougn to supply fluid under pressure to the upper side of the plate for forming the canopy as hereinafter described.

Positioned on top of the plate 2 around the edges thereof is a frame-like flat gasket or member 4 of rubber or rubber-like material against which rests the sheet 5 of transparent plastic material. The sheet 5 may be of laminated or single construction. The sheet 5 extends beyond the plate 2 at one end of the apparatus and is adapted to be removably secured in clamping means 6 of any suitable type mounted on bracekts 7 fastened to the plate 2.

The other end of the sheet 5 is releasably gripped in a jaw 8 of any suitable type and the jaw is adapted to be moved longitudinally as by a cable 9 which extends to a winch 10 driven through a gear reducer 11 and a variable speed transmission 12 by a motor 13.

During the longitudinal stretching of the sheet 5, by the mechanism last described, it is sometimes desirable to hold the sides of the sheet against inward movement but without interfering with the longitudinal stretching operation. This is achieved in the form of the invention illustrated by providing a bar 14 spaced from each side of the plate 2 but mounted thereon by brackets 15. Each bar 14 carries slidably a plurality of clamps 16 each of which is adapted to releasably engage with the edge of the sheet 5, as best seen in Fig. 3. Rollers 17 and 18 carried by each clamp engage with the bar 14 and allow the clamps to move longitudinally but not laterally of the bar. Thus, by attaching the clamps 16 in spaced relation to the sides of the sheet 5 prior to the longitudinal stretching thereof the sides of the sheet are held against inward movement during longitudinal stretching, all without interfering with the longitudinal stretching operation.

It will be understood that stretching of the sheet 5 is facilitated by heating it in an oven to a relatively soft plastic state prior to the actual stretching operation.

Fig. 5 illustrates diagrammatically a modification of the method and apparatus already described. In Fig. 5 the sheet 5 of transparent plastic material held by the fixed clamping means 6 at one end and engaged by the jaw 8 at the other is first stretched longitudinally by pull on the cable 9, in the manner heretofore set forth. During this operation, in accord with the procedure of the apparatus of Fig. 5, the sides of the sheet 5 are not held against inward movement and they move inwardly to the position shown in Fig. 5. In other words, the clamps 16 are not utilized, in fact, they are removed from the apparatus.

After the sheet 5 has been stretched longitudinally jaw 8 is locked in stretched position, for example, by dropping pins through holes 19 in the jaw and into corresponding or selected holes in plate 2. Then a pair of jaws 20 are releasably clamped to the sides of the sheet 5, and cable 9 is detached from jaw 8 and is connected to cables 21 which connect to jaws 20. The cables 21 extend over pulleys 22 mounted on laterally directed frame portions 23. Pull on cable 9 by winch 10 and the driving means therefor now stretches sheet 5 laterally.

Once the sheet 5 has been stretched by one or the other of the methods described, and while it is held in the stretched condition, but before it has had time to set, the sheet is formed to the compoundly-curved canopy shape. This is done with the aid of a jig, indicated as a whole by the numeral 24. The jig 24 is normally lifted out of the way during the stretching of the sheet 5, but as soon as the stretching is completed the jig 24 is quickly moved into position over top of the sheet and the jig is clamped tightly over the sheet to hold it down against the gasket 4 carried on plate 2. Quick-release clamps 25 hold the assembly together.

Fluid, usually compressed air, is now supplied through conduct 3 to the under side of the sheet 5 and the sheet is blown or moved, by the differential pressure existing on its opposite sides, upwardly into the jig opening. The jig opening is of dumbbell-shape including pod-like, substantially circular ends 26 and 27 connected by a portion 28 forming the canopy proper, substantially in the manner illustrated in this inventor's earlier patent, namely, U. S. Patent No. 2,440,499.

The jig 24 also has gauge members 29 (shown only in Fig. 2 for the sake of clarity) of inverted U-shaped positioned substantially at the junction of the circular ends 26 and 27 with the center portion 28. The gauge members 29 may slant somewhat away from each other as shown in Fig. 2 and define substantially the lines or planes on which the canopy is mounted in its support frame in the airplane. Joining the gauge members 29 and extending centrally and longitudinally of the jig is a top center line gauge member 30.

In the method of the invention the sheet 5 is blown into the jig openings and out into contacting engagement with the gauges 29 but spaced approximately ¼ inch from the guage member 30. Usually the sheet 5, with controlled blowing, is brought out to just touch gauge members 29 to effect a seating thereagainst but without further blowing of the canopy.

The jig 24 has several important features. First, as best seen in Figs. 2 and 4, the jig is made up of a base portion 31 having a plurality of shim-like portions 32 for controllably building up the thickness of the jig. Screws 33 may be used to secure any selected number of the shim-like portions 32 to the base portion 31.

Selecting or controlling the thickness of the jig 24 is important for the reason that in this manner it is possible to control the amount of lateral stretch given the sheet 5 during the canopy forming operation. More specifically, and having reference to Fig. 4, when the jig 24 is relatively thick as in Fig. 4, the sheet 5 has to stretch through the jig opening, wherein it is supported, before it can move outwardly above the jig in free blown semicircular contour. It has been discovered that it is possible to take a sheet 5 which has been longitudinally stretched 100% by the apparatus of Figs. 1, 2 and 3 and to then blow the sheet in a jig such as that of Fig. 4 and effect 100% stretch laterally of the sheet.

In other words, if the sheet 5 is initially painted with grid lines defining one inch squares, and the sheet is formed into canopy shape as last described, the grid lines on the finished canopy define two inch squares indicating 100% longitudinal and 100% lateral stretch in the finished canopy over the original sheet.

It now becomes a relatively simple matter to control the amount of lateral stretch in the finished canopy by using more or less shim-like portions 32 in association with the jig 24, always remembering that the thicker the jig, the greater the lateral stretch.

This feature of controlling lateral stretching of the canopy by controlling the thickness of the jig is of paramount importance when the sheet is not stretched laterally when flat. However, the feature may also be utilized with the apparatus and method of Fig. 5, as will be understood.

The second important feature of the jig 24 is illustrated in Figs. 1 and 3 which shows that the pad-like circular openings 26 and 27 are provided with a plurality of shim-like members 34 and 35 for changing the size of the circular openings. Of course, as the sheet 5 moves through the openings 26 and 27 it takes the form of a portion of the surface of a sphere and near the end of the blowing operation substantially a hemi-sphere. It has been discovered that the larger the openings 26 and 27 are made the flatter the top center line of the canopy becomes. Thus, it becomes possible to control the contour of the top center line of the canopy, and, accordingly the front to back contour of the canopy and its streamline characteristics by selecting the proper size opening 26 or 27, the size of these openings being changed by using more or less of the shim-like members 34 and 35 in each opening, which members are removably held in position with screws or other means not shown. In those regions where the shim-like portions 32 overlap the shim-like members 34 and 35, it will be understood that separable shim-like portions 32 are removably mounted on and coincide to the shim-like members 34 and 35 being held in position by screws 36.

In this manner the top center line of the canopy can be contoured to match the requirements of a particular gauge member 30. The chain dotted lines in Fig. 2 illustrate a typical shape that the sheet 5 takes at the end of a blowing operation.

Once blown in the manner described the canopy is allowed to cool and set whereupon the jig 24 is unclamped and lifted and the canopy is removed from the apparatus and is trimmed to finished shape at gauge members 29 and an inch or two below the upper surface of the jig 24.

While in accord with the patent statutes certain embodiments of the invention have been illustrated and described in detail, it is to be particularly understood that the scope of the invention is not limited thereto but is defined in the appended claims.

Reference has been made to 100% longitudinal and lateral stretch. This is usually desirable to obtain good shatter resistance improvement, but sometimes greater stretch is used or lesser stretch dependent upon the particular plastic sheet material.

What is claimed is:

1. Apparatus for forming airplane canopies and the like from a transparent plastic sheet including means for stretching the sheet longitudinally movable, means for holding the sides of the sheet against inward movement during the stretching longitudinally, jig means having an opening defining substantially the base of the canopy to be formed and at its ends defining pod openings controlling the longitudinal top contour of the canopy, said jig means being adapted to be positioned over the stretched sheet, blow means for applying force to the sheet to move it into the opening in the jig means, means for setting the thickness of the jig means to prevent lateral bulging of the sheet and to control the amount of lateral stretching of the sheet in the free blowing movement thereof through the opening in the jig means, and shim members removably positioned in the pod openings to control the size thereof in the jig means to determine the front to rear contour of the formed canopy.

2. That method of forming transparent plastic canopies for aircraft and the like including the steps of heating a plastic sheet to soften it, longitudinally stretching the flat sheet to approximately twice its original length, holding the sheet edges against movement towards each other during the longitudinal stretching operation, free blowing the stretched sheet to canopy shape and simultaneously forming integrally therewith at the ends thereof semispherically shaped pods to control the longitudinal top curvature of the canopy, supporting the sheet sides against bulging during the blowing step to such a height so that the lateral stretching of the sheet over the supported height plus the lateral stretching of the free blown portion of the sheet substantially corresponds to the longitudinal stretching of the sheet in the finished canopy, cooling the sheet after shaping, and trimming the free blown portion of the canopy from the pods and the supported portions.

3. That method of forming transparent plastic canopies for aircraft and the like including the steps of heating a plastic sheet to soften it, longitudinally stretching the flat sheet to approximately twice its original length, holding the sheet edges against movement towards each other during the longitudinal stretching operation, free blowing the stretched sheet to canopy shape, supporting the sheet sides against bulging during the blowing step to such a height so that the lateral stretching of the sheet over the supported height plus the lateral stretching of the free blown portion of the sheet substantially corresponds to the longitudinal stretching of the sheet in the finished canopy, cooling the sheet after shaping, and trimming substantially the free blown portions of the canopy from the supported portions.

4. That method of forming transparent plastic canopies for aircraft and the like including the steps of heating a plastic sheet to soften it, longitudinally stretching the flat sheet material at least 50%, free-blowing the stretched sheet to canopy shape, supporting the sheet sides during the blowing step to such a height so that the lateral stretching of the sheet over the supported height plus the lateral stretching of the free blown portion of the sheet substantially corresponds to the longitudinal stretching of the sheet in the finished canopy, cooling the sheet after shaping, and trimming substantially the free blown portions of the canopy from the supported portions.

5. That method of forming transparent plastic canopies for aircraft and the like including the steps of heating a plastic sheet to soften it, longitudinally stretching the flat sheet material at least 50%, free-blowing the stretched sheet to canopy shape and simultaneously forming integrally therewith at the ends thereof semi-spherically shaped pods to control the longitudinal curvature of the canopy, supporting the sheet sides during the blowing step to such a height so that the lateral stretching of the sheet over the supported height plus the lateral stretching of the free blown portion of the sheet corresponds to the longitudinal stretching of the sheet in the finished canopy, cooling the sheet after shaping, and trimming substantially the free blown portion of the canopy from the pods and the supported portions.

6. Apparatus for forming airplane canopies and the like from a transparent plastic sheet including means for stretching the sheet longitudinally, longitudinally movable means for holding the sides of the sheet against inward movement during the longitudinal stretching, jig means having an opening defining substantially the base of the canopy to be formed and at its ends defining pod openings the size of which control the longitudinal top contour of the canopy, said jig means being adapted to be positioned against the stretched sheet, blow means for applying force to the stretched sheet to move it into the opening in the jig means, and shim members removably positioned in the pod openings to control the size thereof in the jig means to determine the front to rear contour of the formed canopy.

References Cited in the file of this patent

UNITED STATES PATENTS

| | | |
|---|---|---|
| 2,422,999 | Bagley | June 24, 1947 |
| 2,440,499 | Ames et al. | Apr. 27, 1948 |
| 2,505,146 | Ryan | Apr. 25, 1950 |
| 2,664,593 | Larson | Jan. 5, 1954 |
| 2,706,309 | Lampman | Apr. 19, 1955 |
| 2,759,217 | Peterson | Aug. 21, 1956 |
| 2,763,029 | Tulloss | Sept. 18, 1956 |

FOREIGN PATENTS

| | | |
|---|---|---|
| 474,001 | Great Britain | Oct. 25, 1937 |